(12) United States Patent
Hu et al.

(10) Patent No.: US 10,091,785 B2
(45) Date of Patent: Oct. 2, 2018

(54) SYSTEM AND METHOD FOR MANAGING WIRELESS FREQUENCY USAGE

(71) Applicant: Board of Trustees of The University of Alabama, Tuscaloosa, AL (US)

(72) Inventors: Fei Hu, Tuscaloosa, AL (US); Yeqing Wu, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 195 days.

(21) Appl. No.: 14/736,412

(22) Filed: Jun. 11, 2015

(65) Prior Publication Data

US 2015/0365871 A1    Dec. 17, 2015

Related U.S. Application Data

(60) Provisional application No. 62/010,482, filed on Jun. 11, 2014.

(51) Int. Cl.
| | |
|---|---|
| *H04W 72/04* | (2009.01) |
| *H04W 16/14* | (2009.01) |
| *H04W 72/10* | (2009.01) |
| *H04W 36/06* | (2009.01) |

(52) U.S. Cl.
CPC ....... *H04W 72/0453* (2013.01); *H04W 16/14* (2013.01); *H04W 36/06* (2013.01); *H04W 72/10* (2013.01)

(58) Field of Classification Search
None
See application file for complete search history.

(56) References Cited

U.S. PATENT DOCUMENTS

2015/0180689 A1*  6/2015  Deriche .............. H04L 27/0006
                                                        370/330

OTHER PUBLICATIONS

H. P. Shiang and M. van der Schaar, "Queuing-Based Dynamic Channel Selection for Heterogeneous Multimedia Applications Over Cognitive Radio Networks," in IEEE Transactions on Multimedia, vol. 10, No. 5, pp. 896-909, Aug. 2008.*

N. Sultana and Kyung Sup Kwak, "Non-preemptive queueing-based performance analysis of dynamic spectrum access for vehicular communication system over TV White Space," 2011 Third International Conference on Ubiquitous and Future Networks (ICUFN), Dalian, 2011, pp. 43-48.*

(Continued)

*Primary Examiner* — Charles C Jiang
*Assistant Examiner* — Saad Khawar
(74) *Attorney, Agent, or Firm* — Meunier Carlin & Curfman LLC

(57) ABSTRACT

Systems and methods for managing spectrum handoff with multimedia transmissions over cognitive radio networks are disclosed. The methods may include, for example, determining when a primary user is inactive on the one or more frequencies. The methods may also include assigning a secondary user to the one or more frequencies while the primary user is inactive and detecting return by the primary user to the one or more frequencies. The secondary user may, in one embodiment, be interrupted and one or more second frequencies that are inactive may be identified. Further, the secondary user may transition to the one or more second frequencies to resume transmission or reception.

18 Claims, 6 Drawing Sheets

(56) References Cited

OTHER PUBLICATIONS

P. Zhu, J. Li and X. Wang, "Scheduling Model for Cognitive Radio," 2008 3rd International Conference on Cognitive Radio Oriented Wireless Networks and Communications (CrownCom 2008), Singapore, 2008, pp. 1-6.*
IEEE Std 802.22-2015, Wireless Regional Area Network (WRAN) Specific Requirements Part 22: CognitiveWireless RAN Medium Access Control (MAC) and Physical Layer (PHY) Specifications: Policies and Procedures for Operation in the TV Bands, in IEEE, 2015.
R.-T. Ma et al., "A POMDP-Based Spectrum Handoff Protocol for Partially Observable Cognitive Radio Networks," in Proc. IEEE Wireless Commun. and Net. Conf. (WCNC), Apr. 2009.
J. Mitola III and G. Q. Maguire, "Cognitive Radio: Making Software Radios More Personal," in IEEE Personal Commun., vol. 6, 1999, pp. 13-18.
Y. Zhang, "Spectrum Handoff in Cognitive Radio Networks: Opportunistic and Negotiated Situations," in Proc. IEEE ICC, Jun. 2009.
L. Zhang, et al., "Modeling for Spectrum Handoff Based on Secondary Users with Different Priorities in Cognitive Radio Networks," in Int. Conf. on Wireless Commun. & Signal Proc. (WCSP), Oct. 2012.
S. Zheng et al., "Target Channel Sequence Selection Scheme for Proactive-Decision Spectrum Handoff," in IEEE Commun. Letters, vol. 15, Dec. 2011, pp. 1332-1334.
Christian, I. et al., "Spectrum Mobility in Cognitive Radio Networks," IEEE Commun. Magazine, vol. 50, Jun. 2012, pp. 114-121.
Feng, W. et al., "Coordination of Multi-Link Spectrum Handoff in Multi-Radio Multi-Hop Cognitive Networks," in Journal of Parallel and Distributed Computing, vol. 72, Apr. 2012, pp. 613-625.
Giupponi, L. et al., "Fuzzy-based Spectrum Handoff in Cognitive Radio Networks," Int. Conf. on Cognitive Radio Oriented Wireless Netw. and Commun., May 2008, pp. 1-6.
Jiang, Y. et al., "An Approximation for Waiting Time Tail Probabilities in Multiclass Systems," IEEE Commun. Lett., vol. 5, Apr. 2001, pp. 175-177.
Joint Video Team (JVT) of ISO/IEC MPEG & ITU-T VCEG, H.264/14496-10, AVC reference software JM14.2, ISO/IEC Std., 2009. [Online]. Available: http://iphome.hhi.de/suehring/tml/download.
Khan, A. et al., "Quality of Experience-Driven Adaptation Scheme for Video Applications over Wireless Networks," IET Communications, vol. 4, Jul. 2010, pp. 1337-1347.
Shiang, H-P. et al., "Online Learning in Autonomic Multi-hop Wireless Networks for Transmitting Mission-Critical Applications," IEEE J. Selected Areas Comm., vol. 28, Jun. 2010, pp. 728-741.
Song, Y. et al., "Performance Analysis of Spectrum Handoff for Cognitive Radio Ad Hoc Networks Without Common Control Channel under Homogeneous Primary Traffic," Proc. IEEE INFOCOM, Apr. 2011, pp. 3011-3019.
Song, Y. et al., "ProSpect: A Proactive Spectrum Handoff Framework for Cognitive Radio Ad Hoc Networks without Common Control Channel," IEEE Trans. Mobile Computing, vol. 11, Jul. 2012, pp. 1127-1139.
Su, H. et al., "Cross-Layer Based Opportunistic MAC Protocols for QoS Provisionings over Cognitive Radio Wireless Networks," IEEE J. Selected Areas Comm., vol. 26, Jan. 2008, pp. 118-129.
Wang, L.C. et al., "Spectrum Handoff for Cognitive Radio Networks: Reactive-Sensing or Proactive-Sensing?" Proc. IEEE Int. in Performance, Computing and Commun. Conf. (IPCCC), Dec. 2008, pp. 343-348.
Wang, C-W. et al., "Modeling and Analysis for Proactive-Decision Spectrum Handoff in Cognitive Radio Networks," Proc. IEEE ICC, Jun. 2009, pp. 1-6.
Wang, L.C. et al., "Modeling and Analysis for Spectrum Handoffs in Cognitive Radio Networks," IEEE Trans. Mobile Computing, vol. 11, Sep. 2012, pp. 1499-1513.
Wang, J. et al., "Opportunistic Packet Scheduling and Media Access Control for Wireless LANs and Multi-hop Ad Hoc Networks," IEEE Wireless Commun. Netw. Conf., vol. 2, Mar. 2004, pp. 1234-1239.
Watkins, C.J.C.H. et al., "Q-learning," Machine Learning, vol. 8, May 1992, pp. 279-292.
Wu, et al., "A Learning-Based QoE-Driven Spectrum Handoff Scheme for Multimedia Transmissions over Cognitive Radio Networks", IEEE Journal on Selected Areas in Communications 32(11), 2014, 2134-2148.
Yang, L. et al., "Proactive Channel Access in Dynamic Spectrum Networks," Physical Communication, vol. 1, Jun. 2008, pp. 103-111.
Yoon, S-U. et al., "Voluntary Spectrum Handoff: A Novel Approach to Spectrum Management in CRNs," Proc. IEEE ICC, May 2010, pp. 1-5.
Zhang, C. et al., "Cooperative Cognitive Radio with Priority Queuing Analysis," Proc. IEEE Intl Conf. Comm. (ICC), Jun. 2009.
Zhao, Q. et al., "Decentralized Cognitive MAC for Opportunistic Spectrum Access in Ad Hoc Networks: A POMDP Framework," IEEE J. Selected Areas Comm., vol. 25, Apr. 2007, pp. 589-600.
Zhao, Q. et al., "Opportunistic Spectrum Access via Periodic Channel Sensing," IEEE Trans. Signal Processing, vol. 56, Feb. 2008, pp. 785-796.
Federal Communications Commission, "Spectrum Policy Task Force Report," Et docket No. 02-135, Nov. 2002.

* cited by examiner

MAIN PARAMETERS FOR QUEUEING ANALYSIS

| SYMBOL | MEANING |
| --- | --- |
| $\lambda_j^{(k)}$ | ARRIVAL RATE OF A USER WITH PRIORITY $j$ AT CHANNEL $k$ |
| $\mu_j^{(k)}$ | SERVICE RATE OF A USER WITH PRIORITY $j$ AT CHANNEL $k$ |
| $E[X_j^{(k)}]$ | FIRST MOMENT OF SERVICE TIME FOR A USER WITH PRIORITY $j$ AT CHANNEL $k$ |
| $E[N_j^{(k)}]$ | AVERAGE NUMBER OF USERS WITH PRIORITY $j$ IN QUEUE $Q_j^{(k)}$ AT CHANNEL $k$ |
| $\rho_j^{(k)}$ | NORMALIZED LOAD OF CHANNEL $k$ DUE TO A USER WITH PRIORITY $j$ AT CHANNEL $k$, WHERE $\rho_j^{(k)} = \lambda_j^{(k)} E[X_j^{(k)}]$ |
| $\omega_{j,i}^{(k)}$ | ARRIVAL RATE OF A TYPE-$(j,i)$ SU CONNECTION AT CHANNEL $k$. $\omega_{j,0}^{(k)} = \lambda_j^{(k)}$ |
| $\Phi_{j,i}^{(k)}$ | EFFECTIVE SERVICE TIME OF A TYPE-$(j,i)$ SU CONNECTION, WHICH IS THE VALID TRANSMISSION TIME FOR A SU CONNECTION WITH PRIORITY $j$ BETWEEN ITS $i^{th}$ and the $(i+1)^{th}$ INTERRUPTIONS AT CHANNEL $k$. $E[\Phi_{j,0}^{(k)}] = E[X_j^{(k)}]$ |
| $\rho_{j,i}^{(k)}$ | NORMALIZED LOAD OF CHANNEL $k$ DUE TO A TYPE-$(j,i)$ SU AT CHANNEL $k$ |

FIG. 3

SYSTEM AND METHOD FOR MANAGING WIRELESS FREQUENCY USAGE

CROSS-REFERENCE TO RELATED APPLICATIONS

This application claims the benefit of U.S. Provisional Patent Application No. 62/010,482, filed on Jun. 11, 2014, entitled "SYSTEM AND METHOD FOR MANAGING WIRELESS FREQUENCY USAGE," the disclosure of which is expressly incorporated herein by reference in its entirety.

STATEMENT REGARDING FEDERALLY FUNDED RESEARCH

This invention was made with government support under grant number DOD 8750-13-1-046 awarded by the U.S. Department of Defense. The government has certain rights in the invention.

BACKGROUND

The radio spectrum includes a number of regulated frequencies and frequency bands that are allocated to various communications. For example, cellular telephones, AM radio, FM radio, and broadcast television services use different frequency bands for transmissions. Companies, such as cellular telephone providers, may license portions of designated frequency bands for communications. The licenses may cover only a particular geographic area so that the same frequency bands may be used by different users in different regions.

Because frequency bands are allocated to particular users, spectrum holes frequently form. A spectrum hole occurs when frequencies that have been assigned to a primary user are not being used by that user at a particular time. Spectrum holes cause less efficient use of the wireless spectrum. Cognitive radio networks attempt to make use of spectrum holes that are not being used by a primary user by dynamically configuring radios to detect inactive channels. These inactive channels can then be assigned to a secondary user until the primary user returns. Once a primary user returns, the secondary user may wait or transition to other inactive channels in a process referred to as spectrum handoff. Determining when and how to enable spectrum handoff in cognitive radio networks with multimedia applications presents challenges due to multiple interruptions from primary users and contentions among secondary users. Switching channels when using multimedia applications can lead to interrupted video streams. Transmitting multimedia applications over cognitive radio networks therefore can lead to a lack of a smooth video delivery when a user expects real-time transmission.

Within wireless networks, multimedia transmissions may also be sent that have differing priorities. For example, a video that a user wants to download for later use need not be delivered at a sufficient speed to allow real-time streaming playback. On the other hand, a multimedia transmission in a military application may need to be delivered without any delay and at very high resolution to aid strategic battlefield decisions. Smooth spectrum handoff and efficient spectrum management may provide acceptable multimedia transmission over cognitive radio networks.

SUMMARY

Systems and methods for managing spectrum handoff with multimedia transmissions over cognitive radio networks are disclosed. The methods may include, for example, determining when a primary user is inactive on the one or more frequencies. The methods may also include assigning a secondary user to the one or more frequencies while the primary user is inactive and detecting return by the primary user to the one or more frequencies. The secondary user may, in one embodiment, be interrupted and one or more second frequencies that are inactive may be identified. Further, the secondary user may transition to the one or more second frequencies to resume transmission or reception.

BRIEF DESCRIPTION OF THE DRAWINGS

FIG. 3 illustrates exemplary parameters for managing wireless frequencies.

DESCRIPTION

Figure 1:
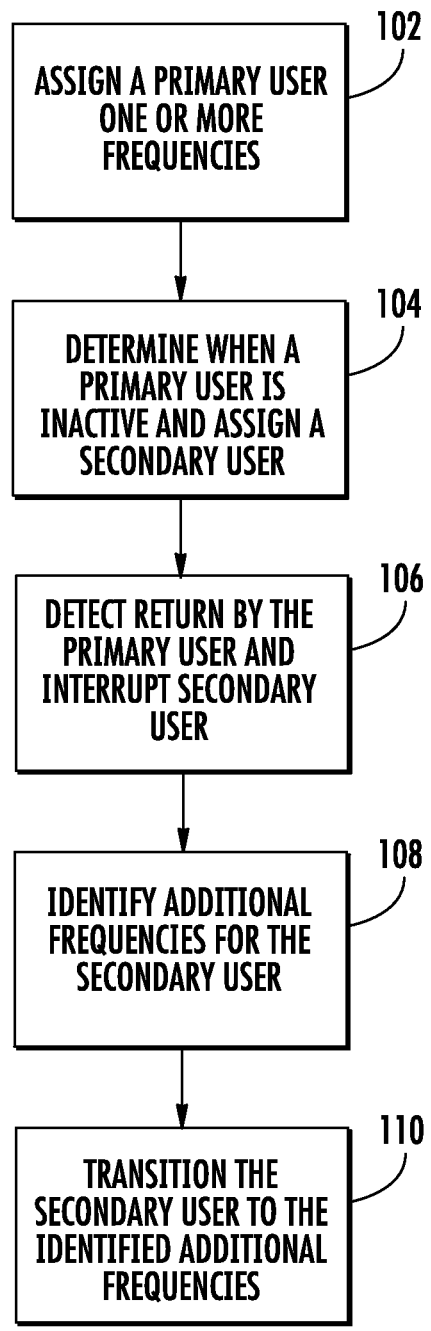
FIG. 1 illustrates an exemplary method for managing wireless frequencies.

The systems and methods described herein may manage spectrum handoff in cognitive radio networks. The spectrum handoff scheme may consider quality of service and quality of experience factors to transmit, for example, multimedia data over cognitive radio networks. A queuing model may estimate delays associated with spectrum handoff, including the time required to find a new channel and switch to it. The handoff scheme may provide an expected video resolution for a particular application. Also, artificial intelligence algorithms may automatically adjust handoff parameters based on historic multimedia performance feedback.

In cognitive radio networks, primary users may be idle or not using allocated frequencies. When a primary user returns, the ongoing secondary user(s) must return the channel control to the primary user. The secondary users will therefore search for existing spectrum holes to switch frequencies. Primary users may return randomly at any time, which can lead to degraded performance when a secondary user needs to switch channels to complete an ongoing transmission.

Three general types of spectrum handoff schemes may exist based on the moment when a secondary user decides to perform a spectrum change. The first is a proactive spectrum handoff where secondary users use knowledge of the primary user's traffic model to predict activities of the primary user. Based on these predictions, the secondary user may identify target channels and perform channel switching before the reappearance of a primary user. This provides a short handoff delay since the new channel can be determined before it is needed, avoiding the time associated with searching for a new channel.

A second exemplary scheme is reactive spectrum handoff, where secondary users search for a target channel after being interrupted by the return of a primary user. Once a target channel has been located, the secondary user switches to the new target channel. The reactive spectrum handoff scheme can obtain an accurate channel status for target channels since the spectrum sensing is performed on-demand. However, reactive handoff may cause longer delays.

A hybrid spectrum handoff scheme may combine reactive and proactive schemes by using proactive spectrum sensing and reactive handoff action. It can achieve faster spectrum handoff since spectrum sensing is not performed on-demand. The systems and methods described in more detail below may use a learning-based quality of experience ("QoE") based hybrid spectrum handoff scheme. A mixed preemptive and non-preemptive resume priority (PRP/NPRP) M/G/1 queuing network model may manage and characterize spectrum usage behaviors of primary users and secondary users in cognitive radio networks. Primary users retain preemptive control over their assigned channels. Queuing among secondary users may be modeled with a NPRP M/G/1 queuing network model, so that, in one exemplary embodiment, secondary users may not interrupt an ongoing transmission of any other secondary user. The queuing model among secondary users preserves the overall delay performance by avoiding frequent spectrum handoffs due to interruptions from other secondary users.

To better support multimedia applications with different QoE requirements, the secondary users may also be prioritized according to their QoE requirements. Secondary users that have a higher priority, such as military or other real-time applications, may be allocated more network resources. The effects of other channel conditions (such as packet error rate (PER)) on the transmission quality may also be considered. To enhance end-user satisfaction of multimedia applications, transmission delay and transmission channel quality, for example, may be considered when choosing channels for spectrum handoff.

FIG. 1 illustrates an exemplary flowchart for managing wireless frequencies. At step 102, a primary user may be assigned one or more frequencies. Next, the system may determine when the primary user is inactive on their assigned frequencies at step 104. This creates a spectrum hole where assigned frequencies are not in use for a primary user in a particular region. To efficiently use network resources, a secondary user may use the one or more frequencies while the primary user remains inactive, also at step 104.

When a primary user returns at step 106, however, the primary user will be given access to their assigned frequencies and the secondary user's data transmissions may be interrupted. A cognitive radio network node observes the current state of a secondary user connection when the secondary user is interrupted by a primary user. As described in more detail below, examples of parameters that may be considered include the current channel condition and traffic load.

At step 108, additional frequencies may be identified for the secondary user to resume its data transmissions. Step 108 may occur before, when, or after a primary user returns. By identifying additional frequencies before an interruption, delays associated with transitioning to a new channel may be reduced. Secondary users may maintain and constantly update a queue of available channels should a primary user return. In one embodiment, the secondary user may search for and select from among available frequencies based on the long term effects on the overall system, while maximizing the quality of experience for a user and considering the current state of the secondary connection. The selection process will be described in more detail below. As mentioned, selecting the target channel candidate may be done proactively, that is, before the primary user returns. Spectrum handoff may be performed reactively, that is, after the primary user returns. Accordingly, a hybrid spectrum handoff strategy may combine reactive and proactive schemes.

The secondary user that has been interrupted by return of a primary user may transition to the identified additional frequencies and resume transmission at step 110. This process may be referred to as spectrum handoff. In one exemplary embodiment, additional secondary users may not interrupt the ongoing transmission of a secondary user even if the additional secondary users have a higher priority. This reduces the number of spectrum handoffs and therefore reduces overall system delays. Priorities may be used, however, to determine which secondary user may access available frequencies when multiple secondary users compete for available frequencies. Higher priority secondary users or secondary users with higher priority transmission may be given priority when accessing available frequencies. Further, secondary users with higher priority may be allocated more frequencies than secondary users with lower priority. Instead of switching frequencies, as described at step 110, a secondary user may also wait on the current channel(s) for the primary user to conclude its use of the channels and return to an inactive status.

To better support multimedia applications, the queuing network model may prioritize secondary users according to their QoE requirements. Secondary users with higher QoE requirements may be assigned higher priorities. In one exemplary embodiment, each channel may maintain a priority queue for each prioritized user group to avoid the head-of-line blocking effect. Specifically, $Q_p^{(k)}$ may be the primary queue for the primary user at channel k. $Q_j^{(k)}$ may be the queue for secondary users with priority j at channel k, for $1 \leq j \leq N$, where N is the number of secondary user priority levels. The secondary user connections with the same priority may follow the first-come-first-served (FCFS) scheduling policy. By not allowing, in one exemplary embodiment, secondary users in the queue with lower priorities to transmit the data before the queuing users with higher priorities in the same channel, the proposed queuing model may provide the queuing secondary users which have higher priorities with more channel access opportunities.

For example, when there is no primary user at a certain channel, the channel may choose to first serve the queuing secondary user with the highest priority. When a primary user arrives, the secondary user being served may be interrupted and may decide whether to wait and stay at the current channel or switch to another one. If the secondary user chooses to stay at the current channel, its connection may be pushed back into the queue of its priority and placed at the head of the queue. If the secondary user chooses to switch to another channel due to an interruption, the remaining data of its connection may be pushed into the tail of the corresponding priority queue in the chosen channel.

After performing handoff, the secondary user connection transitions to a new state with a new traffic load. The handoff delay may be calculated and a model of the queuing status of primary users and other secondary users on the new channel may be built based on the information exchange which is collected by a priority virtual queue interface. Additional performance calculations may also be made. For example, the packet dropping rate caused by the handoff delay can be obtained based on the calculated handoff delay, the deadline of a secondary user connection, and the total delay time for ongoing interruptions. Frequent interruptions can lead to dropping packets in multimedia applications where users expect to receive a streaming video at a speed sufficient for playback.

Based on the packet error rate and the packet dropping rate, the expected mean opinion score (MOS) may be determined as a reward for the handoff action and a Q-table may be updated with the obtained reward. In one exemplary embodiment, this provides a learning process that may be repeated to make spectrum handoff more efficient, as described in more detail below. To enhance end-user satisfaction of multimedia applications, factors including the transmission delay (QoS), transmission channel quality, and users' satisfactory levels (called QoE—quality of experience), may be considered when choosing channels for spectrum handoff. Accordingly, a QoE-driven spectrum handoff scheme may enhance end-user satisfaction by choosing available channel(s) with maximum expected mean opinion score for spectrum handoff.

Figure 2:
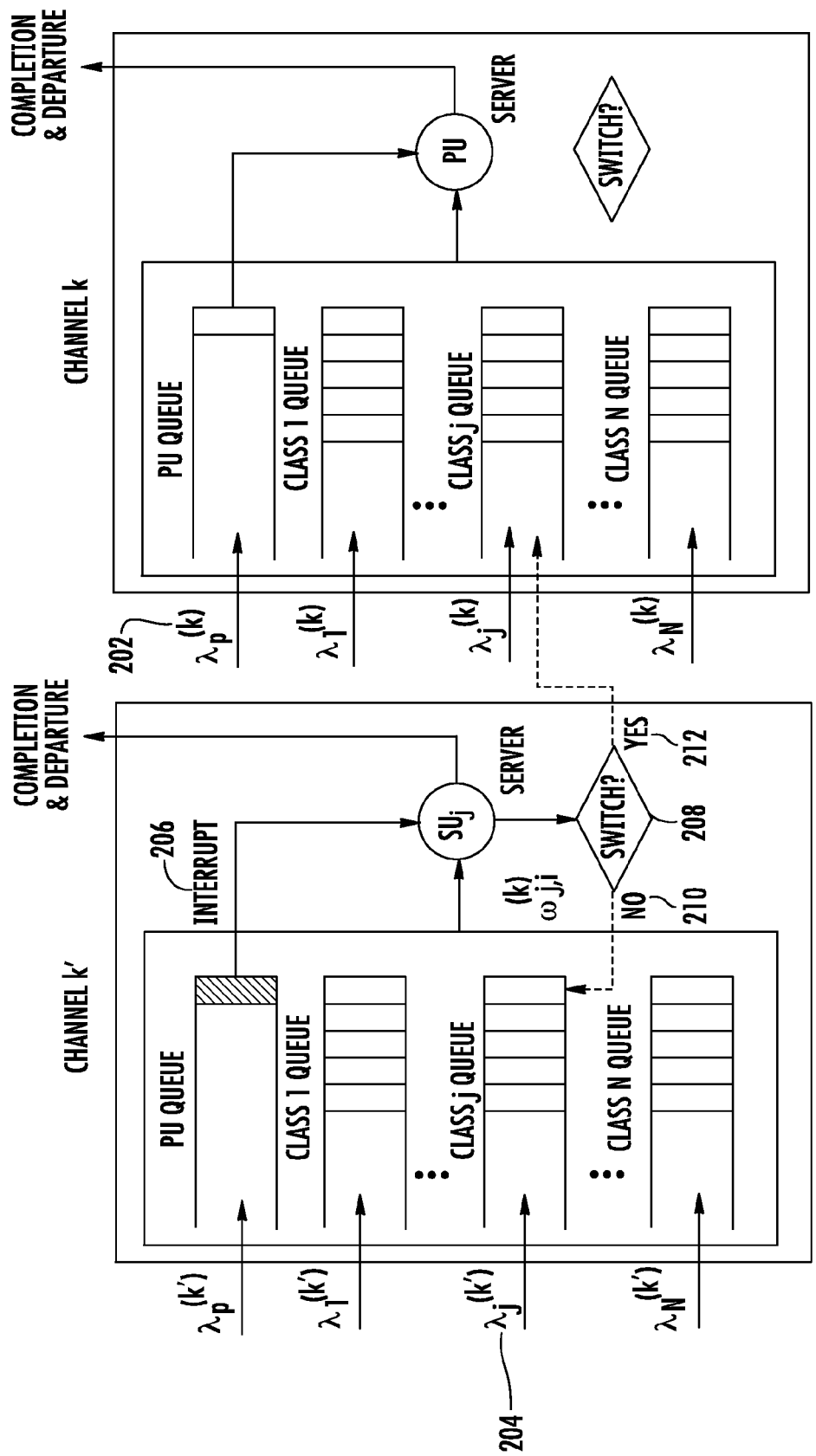
FIG. 2 illustrates an exemplary flow diagram for managing wireless frequencies.

FIG. 2 shows an exemplary queuing scheme when a secondary user interruption from the primary user occurs. For simplicity, only two channels are illustrated, although it will be appreciated that a plurality of channels may be used. As illustrated at 202, a primary user may use channel k and the service will be completed without being interrupted. At channel k' as shown at 204, the queuing secondary user with the highest priority (assuming to be j) is in service. When interrupted by a primary user at 206, the secondary user being served will either stay at k' or switch to another channel. If the secondary user chooses at 208 to stay at k', as shown by the "No" branch after the "Switch" box at 210, its connection is pushed back into the head of $Q_j^{(k')}$. If the secondary user chooses to switch to channel k, as shown by the "Yes" branch after the "Switch" at 212, the remaining data of its connection may be pushed back into the tail of $Q_j^{(k)}$.

The system may also perform a priority queuing analysis of the expected delay performance over time. The delay performance may be evaluated with a mathematical framework. The secondary user connection may have, for example, a priority j that is experiencing its $i^{th}$ interruption as the type-(j, i) secondary user connection, where i≥0. The main parameters of the queuing network model that are used in the analysis are listed in FIG. 3. In one exemplary embodiment, the arrival processes of primary user and secondary user connections may follow independent and identically distributed Poisson distribution. The service time of primary user and secondary user connections may also be independent and identically distributed, and follows a general distribution.

Two exemplary scenarios when the channel gets busy may exist: (1) the transmissions of the primary user's data and (2) the transmission of type-(j, i) secondary user's data using channel k, for 1≤j≤N. Let $p_p^{(k)}$ and $p_{j,i}^{(k)}$ be the probabilities of a given channel k being busy for the above two scenarios, respectively. Let $I_{max}$ be the maximum possible number of interruptions for the secondary user's data. Then, the probability of channel k being busy, $p^{(k)}$, should satisfy the following constraint:

$$\rho^{(k)} = \rho_p^{(k)} + \sum_{j=1}^{N} \sum_{i=0}^{I_{max}} \rho_{j,i}^{(k)} < 1, \text{ for } 1 \le k \le M.$$

If the constraint is not satisfied, the average delay of services for secondary users with priorities j and lower will be infinite, for some j≤N, while the average delay of services for the primary user and secondary users with priorities higher than j will be finite. With this in mind, the expected handoff delay and the expected total delivery time for secondary user connections may be analyzed.

When a secondary user is interrupted, it needs to decide to either stay at the current channel or switch to another available channel. The first case may be referred to as a staying case and the second case may be referred to as a switching case. To choose the optimum handoff behaviors for the interrupted secondary user, the expected mean opinion score of target channels and thus the expected handoff delay time of choosing each available channel may be estimated.

The interrupted secondary user connection may have priority j as $SU_j$. Seven exemplary types of user connections may exist at the target channel whose service time may affect the expected handoff delay of $SU_j$. First, $PU_a$ may be the arriving primary user connection at the target channel. Second, $U_c$ may denote the ongoing serving user at the target channel, which can be any ongoing serving primary user or secondary user with any priority. An ongoing serving secondary user may exist in a given channel only when there is no primary user in the channel, since a primary user can interrupt any secondary user in service. Third, $PU_{old}$ may be queuing primary user connections at the target channel. Fourth, $SU_H$ may be the set of queuing secondary user connections with priorities higher than j, and the connections arrive before the $SU_j$ is at the target channel. Fifth, $SU_j$ may be the set of queuing secondary user connections in $Q_j^{(k)}$, and the connections arrive at the target channel before the interruption. Sixth, $PU_{old}$ may be the set of primary user connections where the connections arrive at the target channel after the interruption while $SU_j$ is at the target channel. Seventh, $SU_{new, H}$ may be the set of secondary user connections with priorities higher than j, where the connections arrive at the target channel after the interruption while $SU_j$ is at the target channel.

Figure 4:
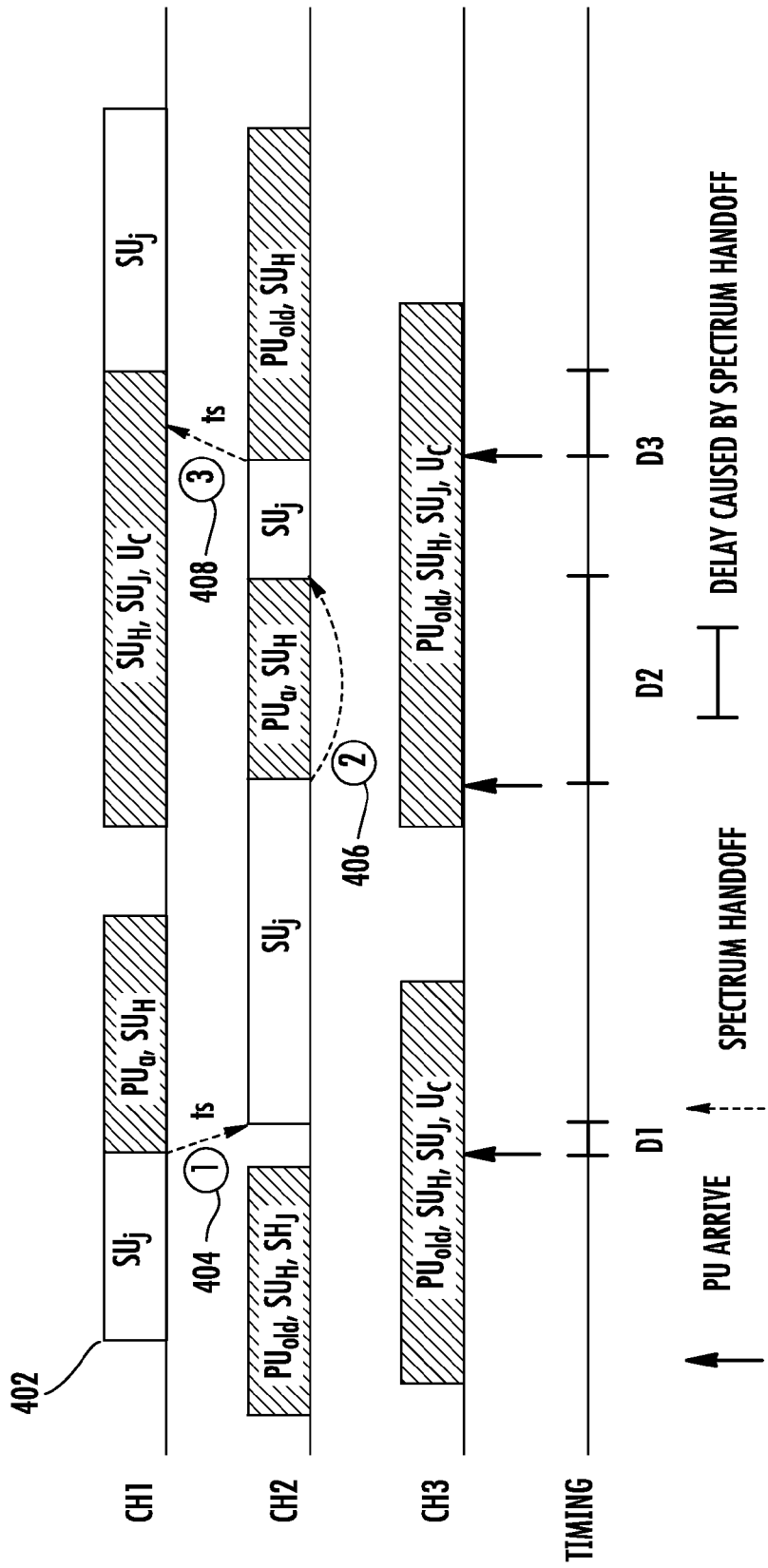
FIG. 4 illustrates an example of spectrum handoff.

FIG. 4 shows an example of spectrum handoff when multiple interruptions occur during the transmission period of $SU_j$. For simplicity, FIG. 4 illustrates only three channels being accessible to the secondary user of interest although fewer or additional channels may also be available. In the beginning of this example, a secondary user connection, $SU_j$ is established at channel 1 as illustrated at 402. Each time the secondary user is interrupted by a primary user, it chooses the best available channel to carry out spectrum handoff.

At the first interruption shown at 404, channel two may be the best available channel so the secondary user connection switches to channel two. Since channel two is idle when the switch occurs, the handoff delay equals the switch time $t_s$. At the second interruption shown at 406, $SU_j$ chooses to stay at channel two and is pushed into the front of queue $Q_j^{(2)}$ waiting for the service of the arriving primary user and queuing $SU_H$ being completed. At the third interruption at 408, channel one is chosen, which is serving an ongoing user $U_c$. Accordingly, $SU_j$ may be pushed into the back of queue $Q_j^{(1)}$. The service for $SU_j$ will not be resumed before the service of $U_c$ and the previously queued $SU_H$ has completed.

For each interruption, there may be $PU_{new}$ and $SU_{new,H}$ which the handoff scheme may estimate when choosing the best available channel. This process will be described in more detail below. The first (404) and third (408) secondary user handoff behaviors provide two special examples of the switching case, and the second one (406) is an example of the staying case. Let the handoff delay $E[D_{j,i}^{(k)}]$ be the time duration from the instant when the $i^{th}$ interruption occurs until the instant when the interrupted transmission is resumed, assuming channel k is chosen for spectrum handoff. The handoff delay may be different for the staying case and the switching case.

$E[W'^{(k)}_{j,i}]$ may be the average waiting time of the $i^{th}$ interruption if the $SU_j$ chooses to stay at current channel, and $E[W^{(k)}_{j,i}]$ as the waiting time of the $i^{th}$ interruption if the $SU_j$ chooses to switch to another channel after the $i^{th}$ interruption. Depending on the spectrum handoff case (e.g., a staying case or a switching case), the expected handoff delay $E[D^{(k)}_{j,i}]$ can be calculated as $$E[D^{(k)}_{j,i}] = \begin{cases} E[W'^{(k)}_j], & \text{if } c_{i-1} = c_i = k \\ E[W^{(k)}_j] + t_s, & \text{if } (c_{i-1} = k') \neq (c_i = k) \end{cases}$$

$$E[D^{(k)}_{j,i}] = \begin{cases} E[W'^{(k)}_j], & \text{if } c_{i-1} = c_i = k \\ E[W^{(k)}_j] + t_s, & \text{if } (c_{i-1} = k') \neq (c_i = k) \end{cases}$$

where $c_i$ denotes the target channel of the secondary user of interest for spectrum handoff at the $i^{th}$ interruption. The secondary user waiting time may, in one example, be $E[W'^{(k)}_{j,i}]$ and $E[W^{(k)}_{j,i}]$. Secondary users may detect the existence of primary users.

The presence of any ongoing secondary users in the channel may not affect the waiting time of the primary user connection. The expected waiting time for a primary user connection at channel k depends on the residual service time of the ongoing primary user connection and the average number of primary user connections in the primary queue. Let $\lambda_p^{(k)}$ be the primary user arrival rate, $\mu_p^{(k)}$ be the service rate of primary users and $E[X_p^{(k)}]$ be the average service time of the primary user at channel k. Let $E[N_p^{(k)}]$ be the mean residual time for the ongoing primary user connection at channel k; and $E[N_p(k)]$ be the average number of primary user connections waiting in the queue. The expected primary user waiting time $E[W_p^{(k)}]$ and the average number of primary user connections waiting in the primary queue at channel k as $$E[W_p^{(k)}] = \frac{E[R_p^{(k)}]}{1-\rho_p^{(k)}} = \frac{\lambda_p^{(k)}E[(X_p^{(k)})^2]}{2(1-\lambda_p^{(k)}E[X_p^{(k)}])},$$

where $\rho_p^{(k)} = \lambda_p^{(k)} E[X_p^{(k)}]$.

$$E[N_p^{(k)}] = \lambda_p^{(k)} E[W_p^{(k)}] = \frac{(\lambda_p^{(k)})^2 E[(X_p^{(k)})^2]}{2(1-\lambda_p^{(k)}E[X_p^{(k)}])}.$$

Turning to the secondary user waiting time, two exemplary cases will be described. First, in a staying case, the secondary user connection with priority j chooses to stay at current operating channel, e.g. $c_i = c_{i-1} = k$. As illustrated, after being pushed back into the queue $Q_j^{(k)}$, it must, in one example, wait until the traffic of $PU_a$, $SU_H$, $PU_{new}$, and $SU_{new,H}$ at channel k are served. Thus, the value of $E[W'^{(k)}_{j,i}]$ may include three parts: the service time of the arriving primary user, service time of $SU_H$ and service time of newly arriving users $PU_{new}$ and $SU_{new,H}$.

Let $E[W_{SU}^{(k)}]$ be the expected cumulative waiting time resulting from the queuing secondary user connections with higher priorities at channel k and $E[W'^{(k)}_{new}]$ be the cumulative waiting time caused by newly arriving primary user and secondary user connections with higher priorities during the $i^{th}$ interruption. The average waiting time may be $$E[W'^{(k)}_j] = E[X_p^{(k)}] + E[W_{SU_H}^{(k)}] + E[W'^{(k)}_{new}],$$

where $E[W_{SU_H}^{(k)}] = \sum_{n=1}^{j-1} \sum_{i=0}^{l_{max}} E[N_{n,i}^{(k)}] E[\Phi_{n,i}^{(k)}],$ $$E[W'^{(k)}_{new}] = \lambda_p^{(k)} E[W'^{(k)}_j] E[X_p^{(k)}] + \sum_{n=1}^{j-1} \sum_{i=0}^{l_{max}} \omega_{n,i}^{(k)} E[W'^{(k)}_j] E[\Phi_{n,i}^{(k)}],$$

where, $\lambda_p^{(k)} E[W'^{(k)}_j] E[X_p^{(k)}]$ and $$\sum_{n=1}^{j-1} \sum_{i=0}^{l_{max}} \omega_{n,i}^{(k)} E[W'^{(k)}_j] E[\Phi_{n,i}^{(k)}]$$

are the cumulative service time for the newly arriving users $PU_{new}$ and $SU_{new}$. $E[\Phi_{n,i}^{(k)}]$ is the expected service time for a type-(n, i) secondary user connection, which means the expected transmission duration of a secondary connection with priority n between its $i^{th}$ and $(i+1)^{th}$ interruption. Applying Little's Theorem $E[N]=\Lambda E[W]$ and the normalized load $\rho=\lambda/\mu=\Lambda E[X]$, $E[W'^{(k)}_j]$ may also be expressed as $$E[W'^{(k)}_j] = \frac{\prod_{l=1}^{j-1}\left(1-\rho_p^{(k)} - \sum_{n=1}^{l-1}\rho_n^{(k)} + \sum_{i=0}^{l_{max}}\rho_{l,i}^{(k)}\right)}{\prod_{l=1}^{j}\left(1-\rho_p^{(k)} - \sum_{n=1}^{l-1}\sum_{i=0}^{l_{max}}\rho_{n,i}^{(k)}\right)}$$

Turning to the switching case, the interrupted secondary user connection with priority j may also choose to switch from channel $c_{i-1}=k'$ to another channel, e.g., $c_i=k$. After the switch, it may wait in the tail of $Q_j^{(k)}$, until the other traffic has been served. $E[W_j^{(k)}]$ may be the waiting time for the interrupted secondary user connections with priority j at channel k. Hence, $E[D_{j,i}]=E[W_j^{(k)}]+t_s$.

$E[R^{(k)}]$ may be the average residual service time of the ongoing connection ($U_c$) at channel k and may be calculated by:

$$E[R^{(k)}] = \frac{1}{2}\lambda_p^{(k)} E[(X_p^{(k)})^2] + \frac{1}{2}\sum_{j=1}^{N}\sum_{i=0}^{l_{max}} \omega_{j,i}^{(k)} E[(\Phi_{j,i}^{(k)})^2].$$

With $E[W_{new}^{(k)}]$ as the service time of the newly arriving primary user connections, $PU_{new}$ and secondary user connections, $SU_{new,H}$. The $E[W_j^{(k)}]$ can be expressed as $$E[W_j^{(k)}] = E[R^{(k)}] + E[W_Q^{(k)}] + E[W_{new}^{(k)}],$$

where $E[W_Q^{(k)}] = E[N_p^{(k)}]E[X_p^{(k)}] + \sum_{n=1}^{j}\sum_{i=0}^{l_{max}} E[N_{n,i}^{(k)}]E[\Phi_{n,i}^{(k)}],$ $$E[W_{new}^{(k)}] = \lambda_p^{(k)} E[W_j^{(k)}]E[X_p^{(k)}] + \sum_{n=1}^{j-1}\sum_{i=0}^{l_{max}} \omega_{n,i}^{(k)} E[W_j^{(k)}]E[\Phi_{n,i}^{(k)}],$$

$E[N_{j,i}^{(k)}]$ may be the average number of the type (j, i) secondary user connections which are waiting in queue $Q_j^{(k)}$ at channel k. $E[N_p^{(k)}]E[X_p^{(k)}]$ may be the cumulative service time of primary users which are already in the primary queue of channel k at the moment of handoff. Finally, the general expression of $E[W_j^{(k)}]$ may be:

$$E[W_j^{(k)}] = \frac{(1-\rho_p^{(k)})\left(E[R^{(k)}] + \frac{(\lambda_p^{(k)})^2 E[(X_p^{(k)})^2]}{2(1-\lambda_p^{(k)} E[X_p^{(k)}])} E[X_p^{(k)}]\right)}{\left(1-\rho_p^{(k)} - \sum_{n=1}^{j-1}\sum_{i=0}^{l_{max}} \rho_{n,i}^{(k)}\right)\left(1-\rho_p^{(k)} - \sum_{n=1}^{j}\sum_{i=0}^{l_{max}} \rho_{n,i}^{(k)}\right)}.$$

The system may also analyze the expected delivery time. With traffic-adaptive target channel selection for spectrum handoff, the expected delivery time can be used to evaluate the performance of the proposed queuing model. The expected delivery time of a secondary user connection, which experiences n interruptions during transmission, consists of the expected delays caused by interruptions and its service time. Since the service time of secondary user connections may be known, the expected delivery time of a secondary user connection may be based on the expected delay of the secondary user connection. When $i > I_{max}$, in one exemplary embodiment, the packet may be dropped. This results in $D_{j,i}^{(k)}$ being zero. The probability that the type-(j,i) SU connection will be interrupted is $P_{j,i}^{(k)} = \lambda_p^{(k)} E[\Phi_{j,i}^{(k)}]$. Then, the expected delay of a secondary user connection with priority j may be $$E[\text{Delay}_j] = \sum_{i=0}^{l_{max}} i P_{j,i}^{(k)} E[D_{j,i}^{(k)}].$$

The QoE driven handoff scheme consistent with certain embodiments will now be described. QoE performance may indicate end-user satisfaction for multimedia applications. The QoE-driven spectrum handoff scheme over cognitive radio networks for multimedia applications may maximize the quality of the transmitted data while minimizing transmission delay. For example, the application level, network level parameters, and the spectrum handoff delay may be used to evaluate end-user satisfaction.

In one embodiment, mean opinion score (MOS) may represent the behavior of video peak signal-to-noise ratio (PSNR). The value of mean opinion score may take a given range, such as the range of 1 to 5. In general, the higher mean opinion score is, the higher PSNR may be. In cognitive radio networks, secondary users may experience different channel conditions over time even if they use the same channel. However, errors still may exist, such as packet loss due to excessive delay caused by spectrum handoff and packet error due to poor channel quality such as channel noise. The packet error rate of a certain channel for secondary user transmission with priority j, which is related to modulation and coding schemes, may be $PER_j^{(k)}$. Let $\text{Delay}_{j,i}$ be the delay of a secondary user connection with priority j due to the first i−1 interruptions. A secondary user packet with priority j may be dropped when its delay, due to spectrum handoff, exceeds the delay deadline $d_j$. $PDR_{j,i}^{(k)}$ may be the probability of packet being dropped during the $i^{th}$ interruption. Accordingly, $$PDR_{j,i}^{(k)} = \begin{cases} \rho_{j,i}^{(k)} \exp\left(-\frac{p_{j,i}^{(k)} \times (d_j - \text{Delay}_{j,i})}{E[D_{j,i}^{(k)}]}\right) & \text{if } \rho_{j,i}^{(k)} < 1 \\ 1 & \text{if } \rho_{j,i}^{(k)} \geq 1 \end{cases}$$

$p_{j,i}^{(k)}$ may be the normalized load of channel k caused by a type (j,i) secondary user.

Let $TPER_{j,i}^{(k)}$ be the estimated overall packet error rate of channel k for the secondary user connection with priority j at its $i^{th}$ interruption. The expected mean opinion score for a secondary user with priority j choosing channel k for its $i^{th}$ interruption, $MOS_{j,i}^{(k)}$, can be represented as a function of the sender bitrate (SBR), frame rate (FR) and $TPER_{j,i}^{(k)}$.

$$MOS_{j,i}^{(k)} = \frac{\tau_1 + \tau_2 FR + \tau_3 \ln(SBR)}{1 + \tau_4(TPER_{j,i}^{(k)}) + \tau_5(TPER_{j,i}^{(k)})^2}.$$

In one exemplary embodiment, coefficients $\tau_1$, $\tau_2$, $\tau_3$, $\tau_4$, and $\tau_5$ can be obtained by a linear regression analysis. In the proposed handoff scheme, the mean opinion score may be used as a function of the expected spectrum handoff. In one exemplary embodiment, other parameters of mean opinion score including sender bitrate (SBR) and frame rate (FR) may be fixed. Whenever a secondary user connection is interrupted, the available channel with maximum expected mean opinion score for spectrum handoff may be selected.

Figure 5:
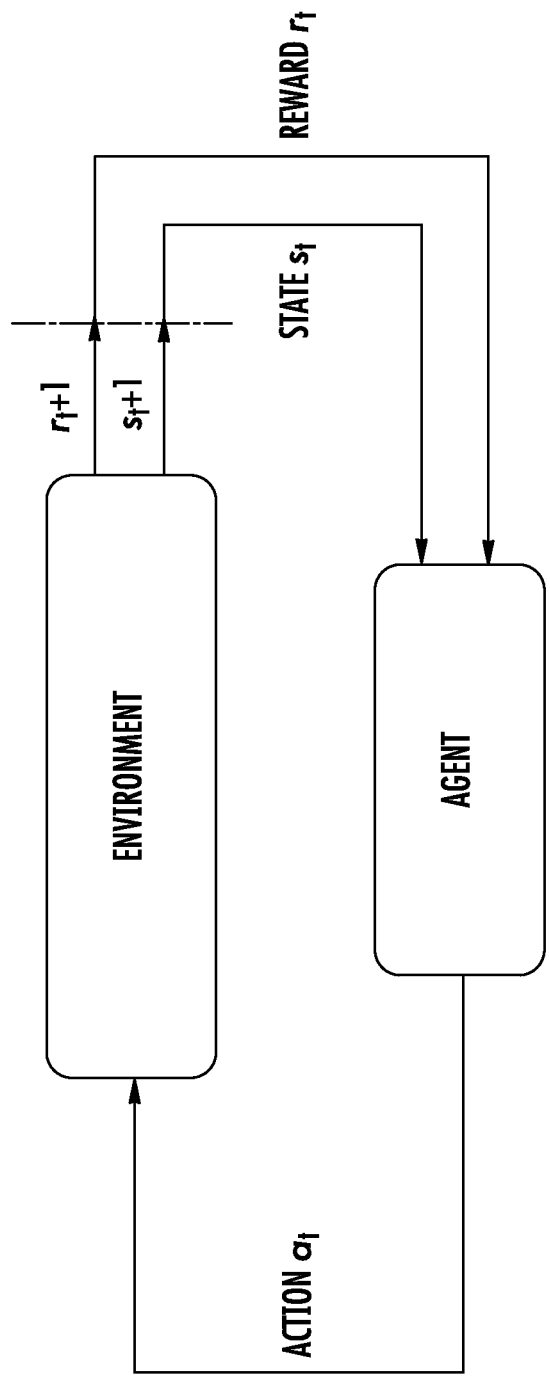
FIG. 5 illustrates an exemplary system state diagram for managing wireless frequencies.

Turning now to FIG. 5, an intelligent spectrum handoff mechanism over cognitive radio networks may be employed by having secondary users adaptively carry out spectrum handoff under evolutionary conditions to maximize the expected mean opinion score. In one exemplary embodiment, spectrum handoff decisions may be modeled as a Markov Decision Process (MDP) with mean opinion score metric as the action reward. A (finite-state) Markov decision process (MDP) can be represented as a tuple (S, A, T, R), where S denotes the set of system states; A is the set of candidate actions at each state; $T=\{P_{s,s'}(a)\}$ is the set of state transition probabilities, where $P_{s,s'}(a)$ is the state transition probability from state s to s' when taking action a in state s; and R:S×A→R is the reward function, which specifies the reward or cost at state s ∈ S when taking action a ∈ A.

The interactions between the agent and the environment at each time step are illustrated in FIG. 5. In one exemplary embodiment, an MDP model may include steps where the agent senses the environment and observes the state s ∈ S, based on the state s, and the agent chooses an action a ∈ A to perform on the environment. Next, the environment may transition to a new state s' and generate a reward (or cost) r ∈ R. The agent may then receive the reward and update the policy. This process may repeat, and may include fewer or additional steps.

In an exemplary implementation using a decentralized cognitive radio network, distributed Qlearning may be used to find optimal decision policies in dynamic scenarios. For a given $SU_j$ connection, the network state before the $(i+1)^{th}$ interruption may be denoted as $s_{j,i}=\{\varepsilon_{j,i}^{(k)}, w_{j,i}^{(k)}, \Phi_{j,i}^{(k)}\}$ where k is the channel at which $SU_j$ is served at the instant when $(i+1)^{th}$ interruption occurs. $\varepsilon_{j,i}^{(k)}$ represents the channel condition of channel k, e.g. physical PER. $w_{j,i}^{(k)}$ and $\Phi_{j,i}^{(k)}$ represent the arrival rate and service rate of type-(j, i) secondary user at channel k, respectively.

When a secondary user connection is interrupted, it may choose to stay at the current channel or select another available channel as previously described. $a_{j,i}=\{\beta_{j,i}^{(k)}\} \in A$ may be the candidate actions of $SU_j$ on state $s_{j,i}$ at its $(i+1)^{th}$ interruption. $\beta_{j,i}^{(k)}$ may represent the channel selecting parameter, which determines the probability of selecting channel k as the transmission channel after the $(i+1)^{th}$ interruption.

The reward r of an action in the proposed QoE-driven spectrum handoff scheme may be the predicted mean opinion score of multimedia transmission for a certain handoff. The expected mean opinion score in may be composed of the packet error rate due to channel condition and the packet dropping rate when the expected delay of spectrum handoff exceeds the delay deadline. With this reward function, the Q-learning may maximize the video quality (measured by MOS) while balancing the delay caused by spectrum handoff. The expected delay of a higher priority video may not be influenced by the other lower priority ones. However, if the class is one of the lower priority classes, the influence of the higher priority traffic is taken into account, by the mean opinion score metric, based on the priority-based queuing model.

The agent at the $(i+1)^{th}$ interruption may find an optimal action which maximizes the expected mean opinion score at current policy $\pi^*(s_{j,i},a_{j,i})$. The Bellman optimality equation may be used to take into account the discounted long-term reward of taking an action. To simplify the notation in the equations, s may represent the state $s_{j,i}$ and s' may represent the new state $s_{j,i+1}$ after taking action $a_{j,i}$. Likewise, a may denote the action and a' may stand for the action $a_{j,i+1}$ on the new state $s_{j,i+1}$. Accordingly, $$V^*(s) = \max_{a \in A} E_{\pi^*} \left\{ \sum_{k=0}^{\infty} \gamma^k r_{j,i+k+1} \middle| s_{j,i}=s, a_{j,i}=a \right\}$$

$$= \max_{a \in A} E_{\pi^*} \left\{ \sum_{k=0}^{\infty} \gamma^k MOS_{j,i+k+1}(a) \middle| s_{j,i}=s, a_{j,i}=a \right\}$$

$$= \max_{a \in A} \left\{ E[MOS_{j,i+1}] + \gamma \sum_{s'} P_{s,s'}(a) V^*(s') \right\},$$

where $0 \leq \lambda \leq 1$ is a discount rate which may decrease the utility impact of the later decisions. In one exemplary embodiment, $\lambda$ may be less than one to ensure that the cumulative reward is bounded over time. As $\lambda$ approaches 1, future rewards may be taken into account more strongly in $V^*(s, a)$. r may be the reward of an action on a state and is defined as the predicted mean opinion score of multimedia transmission. $V^*(s, a)$ may be the utility value for taking action $a=a_{j,i}$ at state $s=s_{j,i}$, then executing the optimal policy $\pi^*$ thereafter.

The Bellman optimality equation may also be expressed as the action-value function $Q^*(s,a)$:

$$Q^*(s, a) = E\{MOS_{j,i+1} + \gamma V^*(s') | s_{j,i}=s, a_{j,i}=a\}$$

$$= E\left\{MOS_{j,i+1} + \gamma \max_{a' \in A} Q^*(s', a') \middle| s_{j,i}=s, a_{j,i}=a\right\}$$

$$= E(MOS_{j,i+1}) + \gamma \sum_{s'} P_{s,s'}(a) \max_{a' \in A} Q^*(s', a').$$

The model-free Q-learning may recursively update the Q-values for a given connection during multiple interruptions:

$$Q(s, a) = (1-\alpha)Q(s, a) + \alpha\left\{E(MOS_{j,i+1}) + \gamma\max_{a' \in A}Q(s', a')\right\}$$

where $0<\alpha<1$ is a small positive fraction called the stepsize parameter that influences the rate of learning. The probability of an agent taking the action a given the state s at its $(i+1)^{th}$ interruption may be denoted by $\pi(s, a)$. The softmax policy may be defined in one exemplary embodiment using the Boltzmann distribution:

$$\pi(s, a) = \frac{\exp\left(\frac{Q(s, a)}{v}\right)}{\sum_{a_m \in A} \exp\left(\frac{Q(s, a_m)}{v}\right)}$$

where v is a positive parameter called the temperature. High temperatures cause the actions to be nearly equally probable. Low temperatures cause a greater difference in selection probabilities for actions that differ in their Q value estimates.

Figure 6:
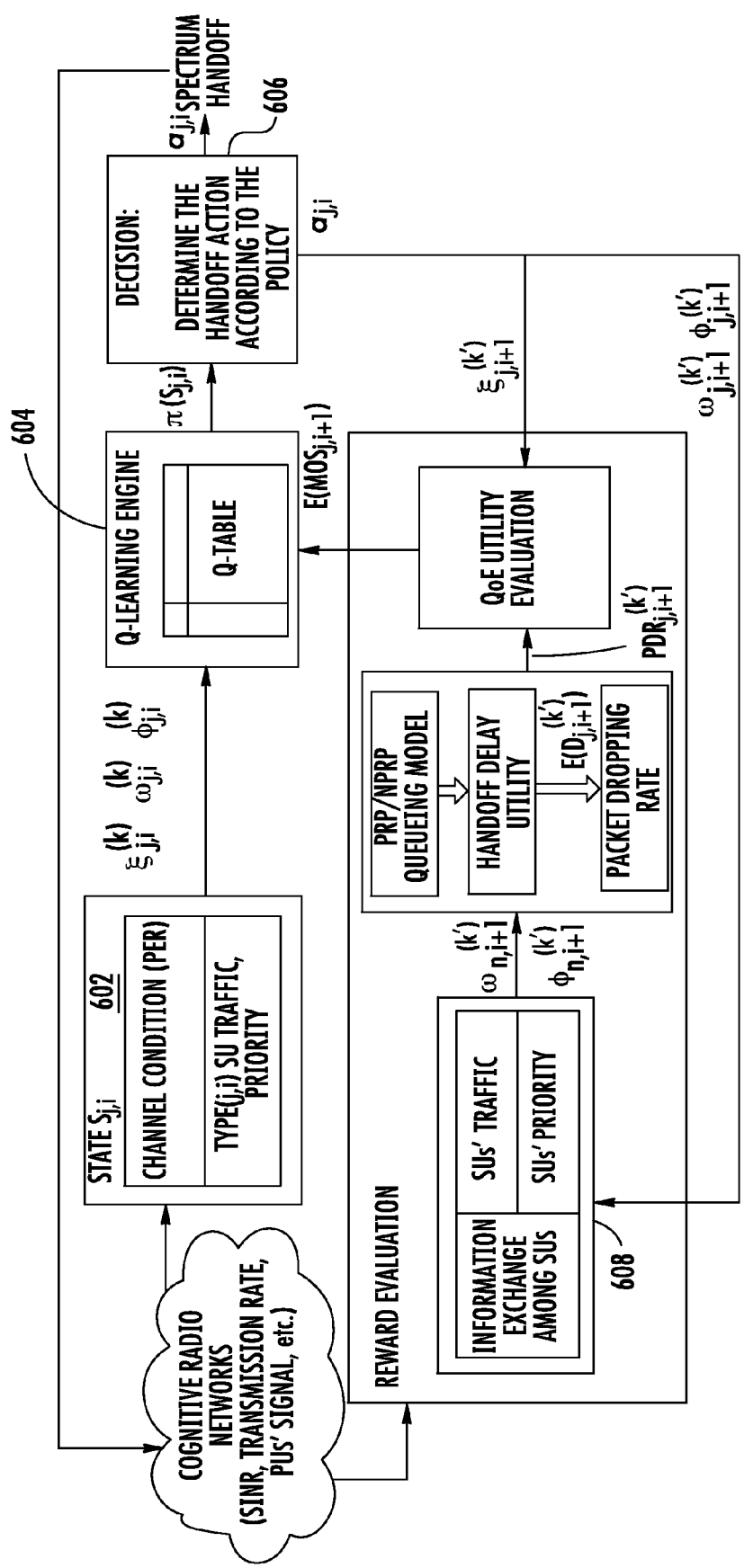
FIG. 6 illustrates an exemplary system state diagram for managing wireless frequencies.

FIG. 6 illustrates an exemplary system diagram of the proposed learning-based QoE driven spectrum handoff scheme. A cognitive radio network node may first observe at 602 the current state $s_{j,i}$ of $SU_j$ connection at its $i^{th}$ interruption. After being interrupted again by a primary user, a cognitive radio network node selects a handoff action for $(i+1)^{th}$ interruption of $SU_j$ connection according to the current state from Q-learning engine 604. Then, $SU_j$ connection performs spectrum handoff and transits to a new state $s_{j,i+1}$ at 606. After transition, a cognitive radio network node obtains a reward and uses this reward to update the Q-table for state $s_{j,i}$ at 608. Accordingly, the described queuing model may prioritize transmission requirements while avoiding the excessive delay caused by frequent spectrum handoffs. A QoE-driven spectrum handoff scheme meets the end-user satisfaction of heterogeneous multimedia users.

The primary and secondary users may be a variety of computing devices, such as personal computers, network servers, routers, switches, gateways, cellular telephones, and others. These devices may include one or more antennas for transmitting and receiving data, along with processor(s), memory, and additional network interfaces for performing the disclosed methods disclosed. Primary and secondary user devices may be equipped with, for example, one or two transceivers, although additional transceivers may also be used. In the example of using two transceivers, one may be used for transmission and another for sensing. Additional transceivers may allow spectrum sensing and data transmission to be conducted simultaneously. A sensing transceiver may observe the channel usage and store the channel statistics for predicting future channel availability. It also may confirm that a newly selected channel after a handoff is idle and available for transmission.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

What is claimed is:

1. A method for managing wireless frequency usage, comprising:
   implementing a mixed preemptive and non-preemptive resume priority queuing network model to manage spectrum usage of a primary user and a plurality of secondary users;
   determining when the primary user is inactive on one or more first frequencies;
   assigning a secondary user to the one or more first frequencies while the primary user is inactive;
   receiving a request from one or more additional secondary users while the secondary user is assigned to the one or more first frequencies, at least one of the additional secondary users having a higher priority than the secondary user assigned to the one or more first frequencies;
   denying the at least one of the additional secondary users having the higher priority access to the one or more first frequencies while the secondary user remains active on the one or more first frequencies;
   detecting return of the primary user to the one or more first frequencies;
   interrupting the secondary user;
   identifying one or more second frequencies that are inactive;
   selecting a frequency from the one or more second frequencies using a cumulative learning algorithm, wherein the cumulative learning algorithm is configured to maximize a quality of experience and minimize transmission delay for the secondary user, and wherein the quality of experience is measured by at least a metric representing transmission channel quality; and
   transitioning the secondary user to the selected frequency, wherein the step of identifying one or more second frequencies that are inactive is performed proactively before the secondary user is interrupted, and wherein the step of selecting a frequency from the one or more second frequencies using a cumulative learning algorithm is performed after the secondary user is interrupted.

2. The method of claim 1, wherein the primary user and the secondary user transmit multimedia messages.

3. The method of claim 1, wherein the first and second frequencies are within a cognitive radio network.

4. The method of claim 1, further including assigning priorities to the plurality of secondary users.

5. The method of claim 1, further including assigning a secondary user with a highest priority to the one or more first frequencies while the primary user is inactive when the plurality of secondary users request access to the one or more first frequencies.

6. The method of claim 1, wherein the cumulative learning algorithm is used to select the frequency from the one or more second frequencies based at least in part on quality of experience requirements of the plurality of secondary users and queueing delay calculations.

7. A system for managing wireless frequency usage, comprising:
   a primary user computing unit; and
   a secondary user computing unit that:
      implements a mixed preemptive and non-preemptive resume priority queuing network model to manage spectrum usage of the primary user computing unit and a plurality of secondary user computing units;
      determines when the primary user computing unit is inactive on one or more first frequencies;
      uses the one or more first frequencies while the primary user computing unit is inactive;
      receives a request from one or more additional secondary user computing units while the secondary user computing unit uses the one or more first frequencies, at least one of the additional secondary user computing units having a higher priority than the secondary user computing unit using the one or more first frequencies;
      denies the at least one of the additional secondary user computing units having the higher priority access to the one or more first frequencies while the secondary user computing unit remains active on the one or more first frequencies;
      detects return of the primary user computing unit to the one or more first frequencies;
      interrupts its data transmissions;
      identifies one or more second frequencies that are inactive;
      selects a frequency from the one or more second frequencies using a cumulative learning algorithm, wherein the cumulative learning algorithm is configured to maximize a quality of experience and minimize transmission delay for the secondary user computing unit, and wherein the quality of experience is measured by at least a metric representing transmission channel quality; and
      transitions to the selected frequency, wherein the step of identifying one or more second frequencies that are inactive is performed proactively before the secondary user computing unit is interrupted, and wherein the step of selecting a frequency from the one or more second frequencies using a cumulative learning algorithm is performed after the secondary user computing unit is interrupted.

8. The system of claim 7, wherein the primary user computing unit and the secondary user computing unit transmit multimedia messages.

9. The system of claim 7, wherein the first and second frequencies are within a cognitive radio network.

10. The system of claim 7, further including assigning priorities to the plurality of secondary user computing units.

11. The system of claim 7, further including assigning a secondary user computing unit with a highest priority to the one or more first frequencies while the primary user computing unit is inactive.

12. The system of claim 7, wherein the cumulative learning algorithm is used to select the frequency from the one or more second frequencies based at least in part on quality of experience requirements of the plurality of secondary user computing units and queueing delay calculations.

13. A non-transitory computer-readable medium comprising instruction which, when executed by a processor and a memory, perform a method for managing wireless frequency usage, comprising:
    implementing a mixed preemptive and non-preemptive resume priority queuing network model to manage spectrum usage of a primary user and a plurality of secondary users;
    determining when the primary user is inactive on one or more first frequencies;
    assigning a secondary user to the one or more first frequencies while the primary user is inactive;
    receiving a request from one or more additional secondary users while the secondary user is assigned to the one or more first frequencies, at least one of the additional secondary users having a higher priority than the secondary user assigned to the one or more first frequencies;
    denying the at least one of the additional secondary users having the higher priority access to the one or more first frequencies while the secondary user remains active on the one or more first frequencies;
    detecting return of the primary user to the one or more first frequencies;
    interrupting the secondary user;
    identifying one or more second frequencies that are inactive;
    selecting a frequency from the one or more second frequencies using a cumulative learning algorithm, wherein the cumulative learning algorithm is configured to maximize a quality of experience and minimize transmission delay for the secondary user, and wherein the quality of experience is measured by at least a metric representing transmission channel quality; and
    transitioning the secondary user to the selected frequency, wherein the step of identifying one or more second frequencies that are inactive is performed proactively before the secondary user is interrupted, and wherein the step of selecting a frequency from the one or more second frequencies using a cumulative learning algorithm is performed after the secondary user is interrupted.

14. The non-transitory computer-readable medium of claim 13, wherein the primary user and the secondary user transmit multimedia messages.

15. The non-transitory computer-readable medium of claim 13, wherein the first and second frequencies are within a cognitive radio network.

16. The non-transitory computer-readable medium of claim 13, wherein the method further includes assigning priorities to the plurality of secondary users.

17. The non-transitory computer-readable medium of claim 13, wherein the method further includes assigning a secondary user with a highest priority to the one or more first frequencies while the primary user is inactive.

18. The non-transitory computer-readable medium of claim 13, wherein the cumulative learning algorithm is used to select the frequency from the one or more second frequencies based at least in part on quality of experience requirements of the plurality of secondary users and queueing delay calculations.

* * * * *